US010811890B2

(12) United States Patent
Vail

(10) Patent No.: US 10,811,890 B2
(45) Date of Patent: Oct. 20, 2020

(54) APPARATUS AND METHOD FOR A PORTABLE-ELECTRONIC-DEVICE ADAPTER

(71) Applicant: Dustin J. Vail, Faribault, MN (US)

(72) Inventor: Dustin J. Vail, Faribault, MN (US)

( * ) Notice: Subject to any disclaimer, the term of this patent is extended or adjusted under 35 U.S.C. 154(b) by 119 days.

(21) Appl. No.: 16/221,087

(22) Filed: Dec. 14, 2018

(65) Prior Publication Data

US 2019/0190287 A1 Jun. 20, 2019

Related U.S. Application Data

(60) Provisional application No. 62/599,581, filed on Dec. 15, 2017.

(51) Int. Cl.

| | |
|---|---|
| ***H02J 7/00*** | (2006.01) |
| ***H02J 7/02*** | (2016.01) |
| ***H02J 50/10*** | (2016.01) |
| ***H04M 1/04*** | (2006.01) |
| ***H04R 1/10*** | (2006.01) |

(52) U.S. Cl.

CPC ............ *H02J 7/0044* (2013.01); *H02J 7/025* (2013.01)

(58) Field of Classification Search

CPC .......... H02J 7/0044; H02J 7/025; H02J 50/10; H02J 7/00; H02J 7/02; H04M 1/04; H04R 1/10

See application file for complete search history.

(56) References Cited

U.S. PATENT DOCUMENTS

| | | | | |
|---|---|---|---|---|
| 8,560,031 B2 * | 10/2013 | Barnett | .................. | F16M 13/00 455/575.8 |
| 9,484,769 B2 | 11/2016 | Kim | | |
| 2003/0213849 A1 * | 11/2003 | Luu | .................. | G06K 19/07739 235/492 |
| 2017/0324438 A1 * | 11/2017 | Mischel | ............. | F21V 33/0052 |

* cited by examiner

*Primary Examiner* — Vuthe Siek

(74) *Attorney, Agent, or Firm* — Jonathan M. Rixen; Lemaire Patent Law Firm, P.L.L.C.

(57) ABSTRACT

An adapter and method for using a grasp-socket component with a handheld electronic device, the adapter including a base layer having a top and a bottom side, wherein the bottom side of the base layer connects to the handheld electronic device; and a top layer that includes a planar surface and a plurality of side walls, wherein the top layer is coupled to the base layer to form a partially-enclosed hollow space between the top side of the base layer and the planar surface of the top layer, wherein the top layer includes an elongated opening in the planar surface that is sized and shaped such that the grasp-socket component can be coupled to the top layer and such that the grasp-socket component can be moved to a plurality of positions along the top surface of the base layer by sliding the grasp-socket component within the partially-enclosed hollow space.

19 Claims, 12 Drawing Sheets

801
8B
8B
801
812
814
811.1
811.1
814.1
814.1
811

*FIG. 1A1*
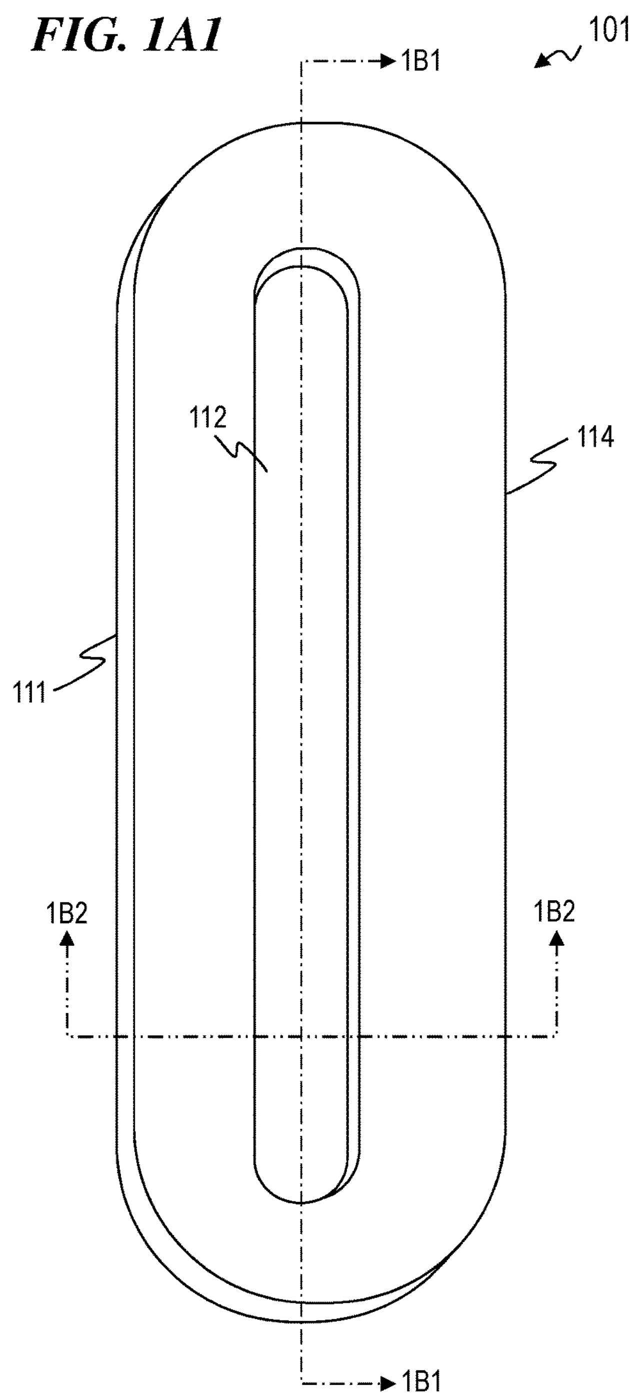
*FIG. 1A2*
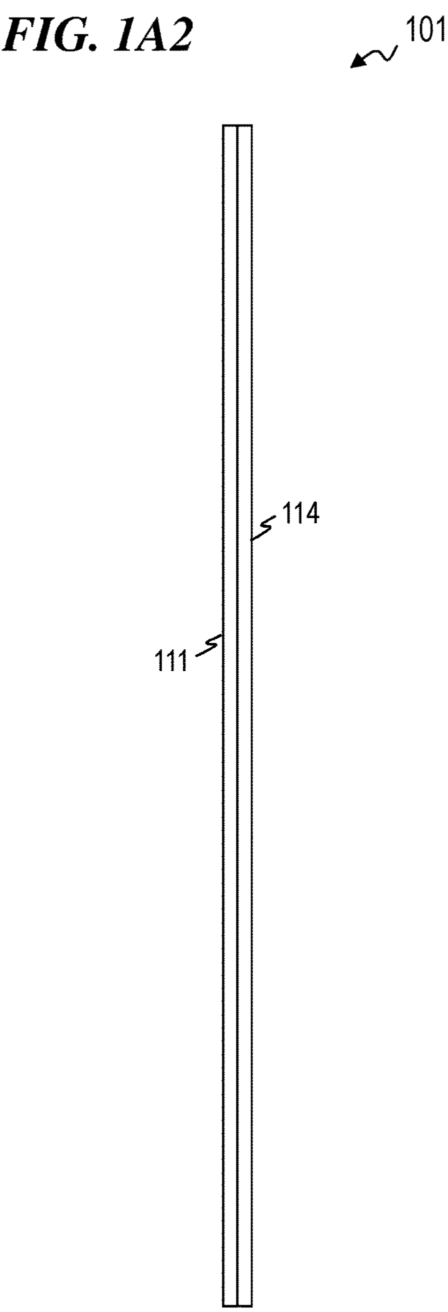
*FIG. 1A3*
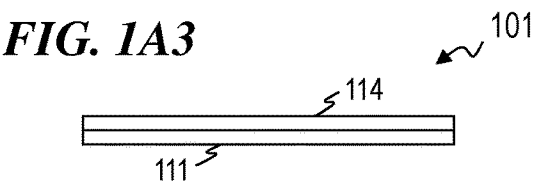

*FIG. 1B1*
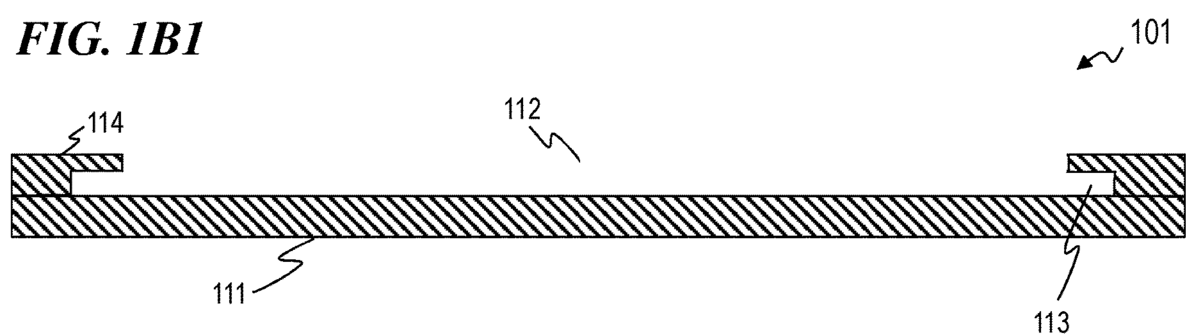
*FIG. 1B2*
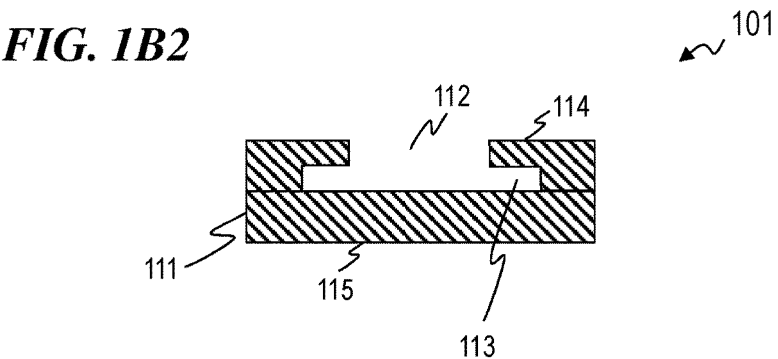

APPARATUS AND METHOD FOR A PORTABLE-ELECTRONIC-DEVICE ADAPTER

CROSS-REFERENCE TO RELATED APPLICATIONS

This application claims priority benefit, under 35 U.S.C. § 119(e), of U.S. Provisional Patent Application 62/599,581 filed Dec. 15, 2017 by Dustin J. Vail, titled "APPARATUS AND METHOD FOR A PORTABLE-ELECTRONIC-DEVICE ADAPTER," which is incorporated herein by reference in its entirety.

FIELD OF THE INVENTION

The present invention relates generally to portable electronic devices, and in particular to adapters and methods for assisting with holding, standing, mounting, and/or wirelessly charging handheld electronic devices.

BACKGROUND OF THE INVENTION

Handheld electronic devices often have cases that provide protection and other functionality such as the ability to stand a device up on its own or clip the device to a belt. Recently, additional products have been developed that couple to a device case (or to the device itself) to provide improved grip, mounting, and/or standing capabilities for the device and/or the device case. One such product is PopSockets® by PopSockets, LLC, which has two buttons connected by an accordion-type structure (see, for example, www.popsockets.com). When used with a handheld electronic device, one button of the PopSockets® product is affixed to a desired location on the device (or on the case of the device) and the other button can then be extended or retracted at that location via the accordion-type structure. Once affixed to a location on the case or device, however, the PopSockets® product is not movable from that location.

U.S. Pat. No. 8,560,031 to David B. Barnett, et al. titled "EXTENDING SOCKET FOR PORTABLE MEDIA PLAYER" (hereinafter, "Barnett et al.") issued on Oct. 15, 2013, and is incorporated herein by reference. Barnett et al. describe extending grasp-sockets, formed of accordions generally with buttons attached at their distal ends, for attaching to portable media players or portable media player cases. Cases having attached grasp-sockets serve purposes beyond protection of the player, such as managing a headset, attaching to belts or the like, forming stand legs to prop the player at a desired angle, forming grips for gaming, forming a grip for securely holding and manipulating player with one hand, and forming extended legs for wedging players that are phones between the ear and shoulder. The grasp-sockets are structured to allow headset cords to be wound around the accordions when the grasp-sockets are extended, to prevent the cords from tangling. Space in an attached case may be provided so that the grasp-sockets may be partially or fully retracted with headphone cords wrapped around them to save space.

Another important development in the area of handheld electronic devices is wireless charging. The typical wireless charger has a pad that must be in contact with a certain area of a device or the device's case in order to wirelessly charge the device. Unfortunately, the area of a handheld electronic device most commonly associated with wireless charging also typically lines up with (or is near) the location where products like PopSockets® are affixed. In such situations, wireless charging is not available for the handheld electronic device because the PopSockets® product prevents the device from contacting the wireless charger at the wireless-charging area of the device.

U.S. Pat. No. 9,484,769 to Dae-Young Kim titled "CASE HAVING WIRELESS CHARGING RECEIVER PAD FOR ELECTRONIC DEVICES" (hereinafter, "Kim") issued on Nov. 1, 2016, and is incorporated herein by reference. Kim describes a case for a portable electronic device includes a soft protective case, a hard protective frame, and a wireless charging receiver pad stored in a pad opening of the soft protective case. The pad opening has first, second, third and fourth walls such that the first and second walls face each other and the third and fourth walls face each other. Upper portions of the first and second walls are slanted to same directions and lower portions of the first and second walls are slanted to same directions whereas the upper and lower portions of the first wall are slanted in opposite directions. In addition, left and right portions of the third wall are slanted in opposite directions and left and right portions of the fourth wall are slanted in opposite directions as well. The right portions of the third and fourth walls are slanted in same directions.

There is a need for improved adapters for handheld electronic devices that allow wireless charging.

SUMMARY OF THE INVENTION

In some embodiments, the present invention provides an adapter for a handheld electronic device (e.g., a mobile phone (such as an iPhone®), tablet (such as an iPad®), MP3 player (such as an iPod®), video-game player (such as a Vita®), or the like; sometimes generically called a mobile device). In some embodiments, the adapter is referred to as a Socket Slider™. In some embodiments, the adapter is affixed to the back side of a case for the handheld electronic device and couples with a PopSockets®-type product (which can be either an actual PopSockets® product or other similar phone-holding device) such that the PopSockets®-type product can be moved (e.g., slid) to various positions along the back side of the case (in some embodiments, instead of affixing to the back side of a case, the adapter affixes directly to the back side of the handheld electronic device itself). In some such embodiments, the ability to slide the PopSockets® product to various positions allows the user of the present invention to position the PopSockets® product such that the handheld electronic device can be charged using a wireless charger (e.g., in some embodiments, the PopSockets®-type product is positioned near the top or bottom of the handheld electronic device during wireless charging). In some embodiments, instead of affixing the adapter to a case or to the handheld electronic device itself, the adapter of the present invention is integrated with the case. In some embodiments, the adapter of the present invention is configured to couple with two or more PopSockets®-type products.

In some embodiments, the present invention further includes a wireless charger that is configured to be mounted on a vertical surface (e.g., a wall) and modified such that a handheld electronic device using the adapter of the present invention with the PopSockets®-type product can be hung vertically on the wireless charger via the extended button of the PopSockets®-type product during wireless charging (in some such embodiments, when hanging the handheld electronic device on the wireless charger of the present invention, the PopSockets®-type product is positioned near the top of the handheld electronic device using the adapter of the present invention).

BRIEF DESCRIPTION OF THE FIGURES

FIG. 1A1 is a perspective-view diagram of an adapter 101 for a handheld electronic device, according to some embodiments of the present invention.

FIG. 1A2 is a side-view diagram of adapter 101, according to some embodiments of the present invention.

FIG. 1A3 is an end-view diagram of adapter 101, according to some embodiments of the present invention.

FIG. 1B1 is a side cross-section view of adapter 101 as would be seen at section line 1B1 of FIG. 1A, according to some embodiments of the present invention.

FIG. 1B2 is an end cross-section view of adapter 101 as would be seen at section line 1B2 of FIG. 1A, according to some embodiments of the present invention.

FIG. 2 is a perspective-view diagram of an adapter system 201, according to some embodiments of the present invention.

FIG. 3 is a perspective-view diagram of an adapter system 301, according to some embodiments of the present invention.

DETAILED DESCRIPTION OF THE INVENTION

Figure 1C:
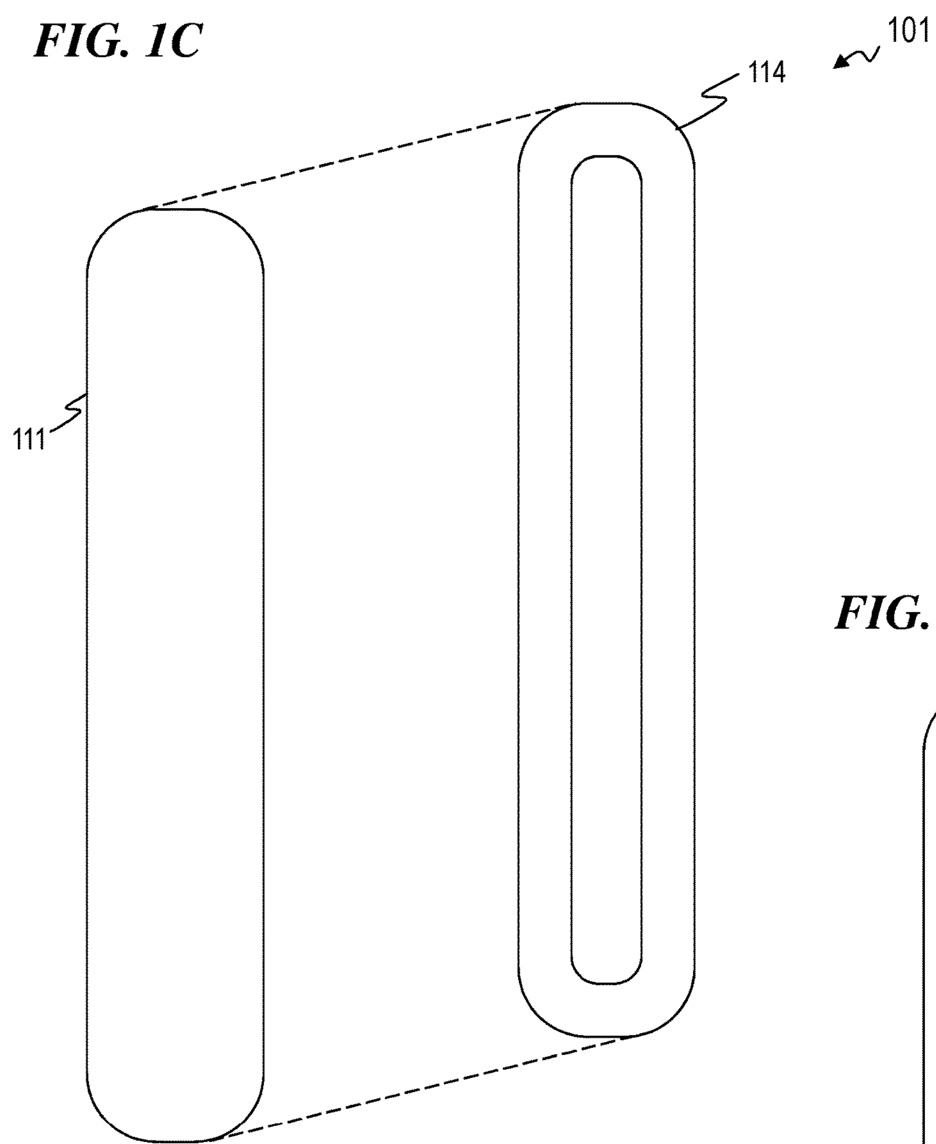
FIG. 1C is an exploded-top-view diagram of adapter 101, according to some embodiments of the present invention.

Although the following detailed description contains many specifics for the purpose of illustration, a person of ordinary skill in the art will appreciate that many variations and alterations to the following details are within the scope of the invention. Specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

It is specifically contemplated that the present invention includes embodiments having combinations and subcombinations of the various embodiments and features that are individually described herein (i.e., rather than listing every combinatorial of the elements, this specification includes descriptions of representative embodiments and contemplates embodiments that include some of the features from one embodiment combined with some of the features of another embodiment, including embodiments that include some of the features from one embodiment combined with some of the features of embodiments described in the patents and application publications incorporated by reference in the present application). Further, some embodiments include fewer than all the components described as part of any one of the embodiments described herein.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Certain marks referenced herein may be common-law or registered trademarks of third parties affiliated or unaffiliated with the applicant or the assignee. Use of these marks is for providing an enabling disclosure by way of example and shall not be construed to limit the scope of the claimed subject matter to material associated with such marks.

FIG. 1A1 is a perspective-view diagram of an adapter 101 for a handheld electronic device, according to some embodiments of the present invention. In some embodiments, adapter 101 includes a bottom layer 111 and a top layer (or cover structure) 114. In some embodiments, cover structure 114 includes a cutout opening 112. In some embodiments, adapter 101 provides a pocket that a product such as PopSockets® (or any other suitable product) can slide back and forth within. In some embodiments, bottom layer 111 is a flat piece of plastic and cutout opening 112 is the width of the accordion-type structure of the PopSockets® product. In some embodiments, adapter 101 is a single component without individual layers that are coupled together.

Figure 2:
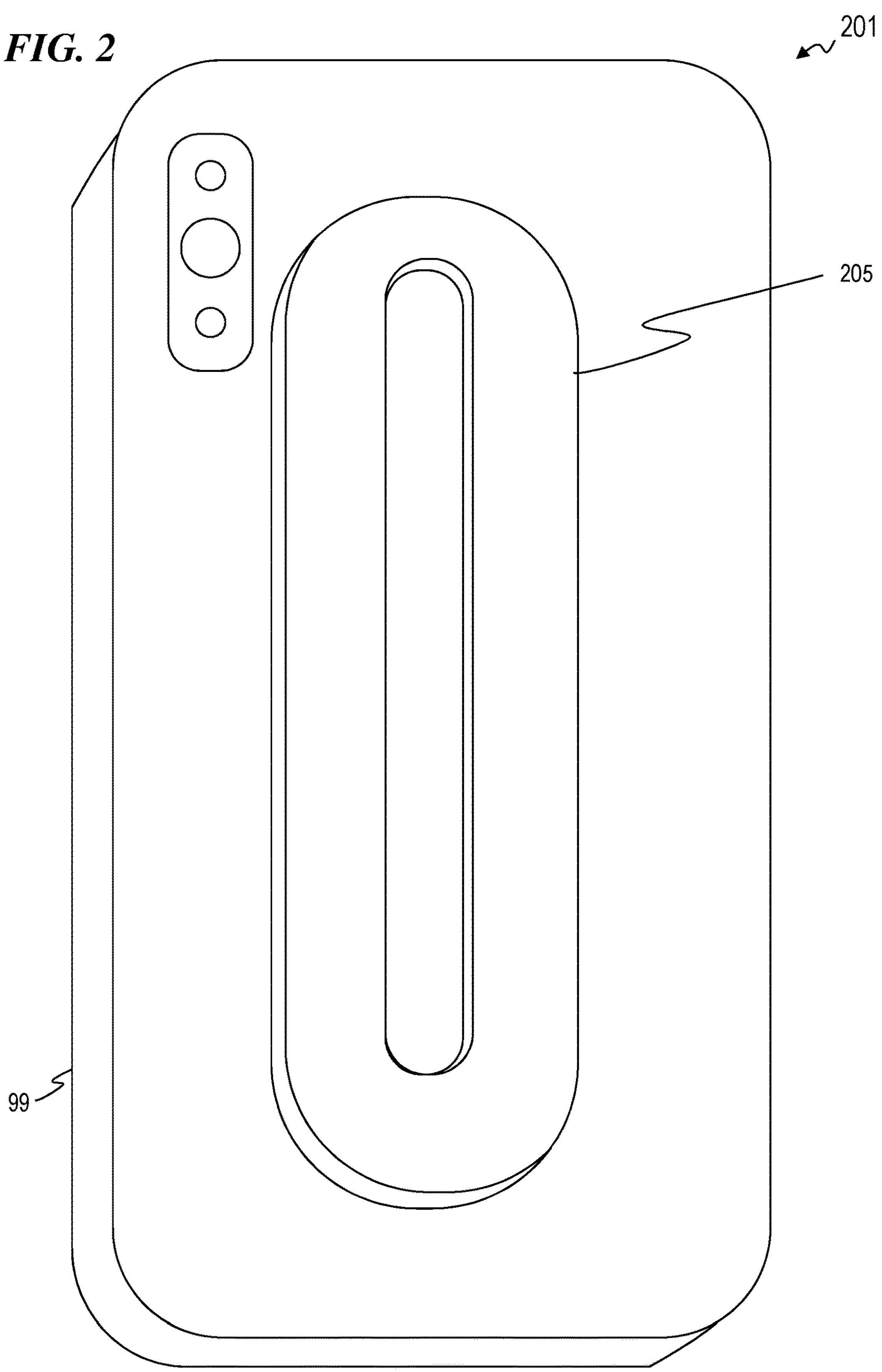

FIG. 1A2 is a side-view diagram of adapter 101, according to some embodiments of the present invention.

Figure 3:
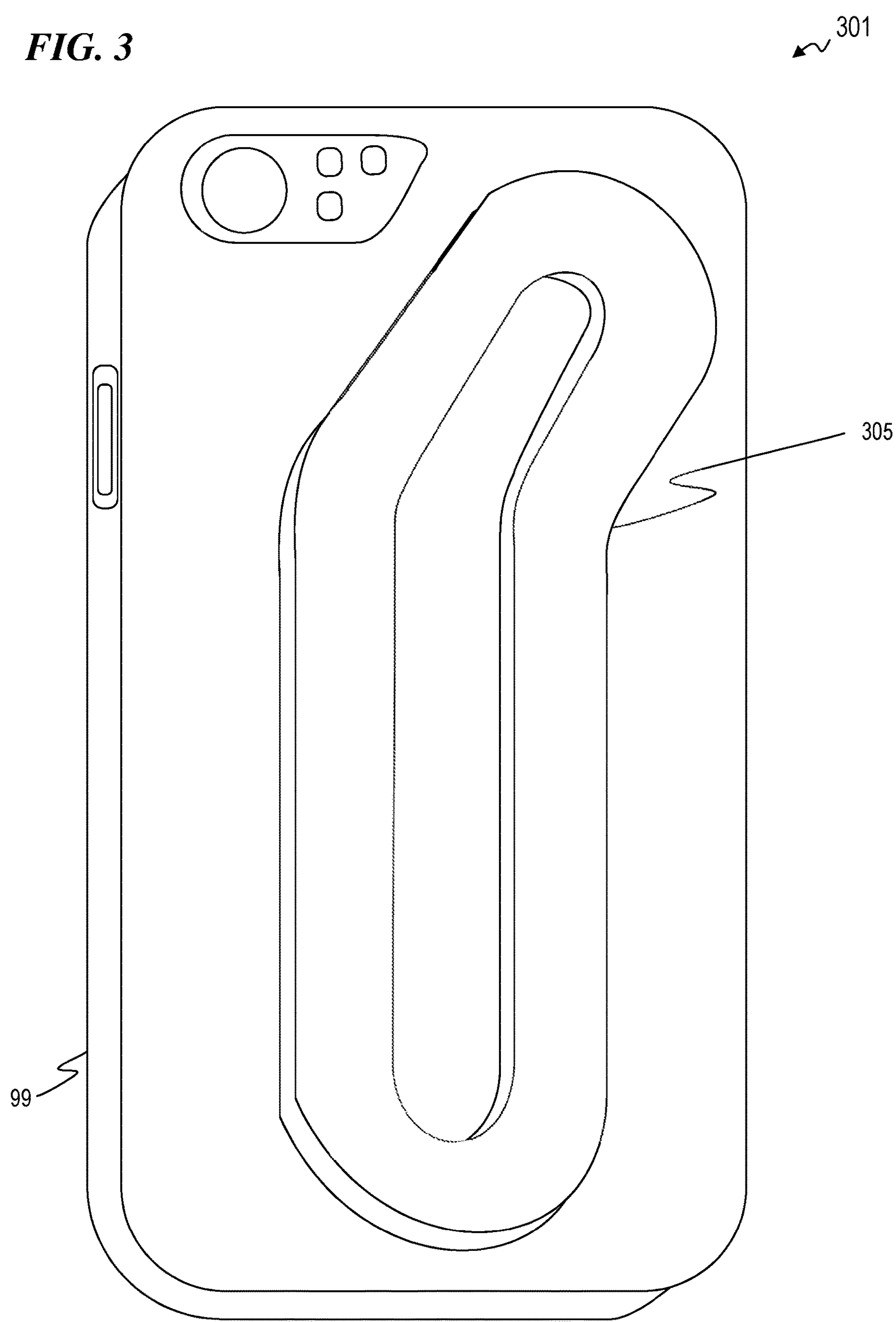

FIG. 1A3 is an end-view diagram of adapter 101, according to some embodiments of the present invention.

FIG. 1B1 is a side cross-section view of adapter 101 as would be seen at section line 1B1 of FIG. 1A, according to some embodiments of the present invention. In some embodiments, cover structure 114 is coupled to bottom layer

111 such that a hollow space 113 or pocket of air is formed in which the lower button (or base button) of the PopSockets® product can slide (in some such embodiments, hollow space 113 has a thickness that is substantially the same as the thickness of the PopSockets® base). In some such embodiments, bottom layer 111 and top layer 114 are coupled together using an adhesive. In some embodiments, cover structure 114 and/or bottom layer 111 is made of a plastic polymer that is flexible, yet sturdy so the PopSockets® product does not separate from the electronic device. In some embodiments, adapter 101 is made of silicone (or a similar stretchy elastic material such as polychlorinated vinyl (PVC), natural rubber, polyisoprene, nitrile or the like). In some embodiments, adapter 101 is made of a plastic such as acrylonitrile butadiene styrene (ABS), polylactic acid (PLA), acrylonitrile styrene acrylate (ASA), polyethylene terephthalate (PET), polycarbonate (PC), or the like. In other embodiments, adapter 101 is made of any other suitable material. In some embodiments, adapter 101 is any suitable color or combination of colors such as red, orange, yellow, green, blue, indigo, violet, or the like.

FIG. 1B2 is an end cross-section view of adapter 101 as would be seen at section line 1B2 of FIG. 1A, according to some embodiments of the present invention. In some embodiments, adapter 101 is configured to be coupled to any suitable handheld or portable electronic device (e.g., mobile phone, tablet, music player, or the like). In some embodiments, adapter 101 includes an adhesive 115 on the bottom side of layer 111 such that adapter 101 can be affixed to the desired position on the back of the handheld electronic device.

FIG. 1C is an exploded-top-view diagram of adapter 101, according to some embodiments of the present invention. In some embodiments, cutout opening 112 of adapter 101 has the shape shown in FIG. 1A, but in other embodiments, cutout opening 112 has any other suitable shape or size necessary to fit the specific electronic device being used (e.g., in some embodiments, cutout opening 112 angles to the right (see, e.g., FIG. 3), angles to the left, or has other suitable positions of travel for the PopSockets® product to slide in).

Figure 1D:
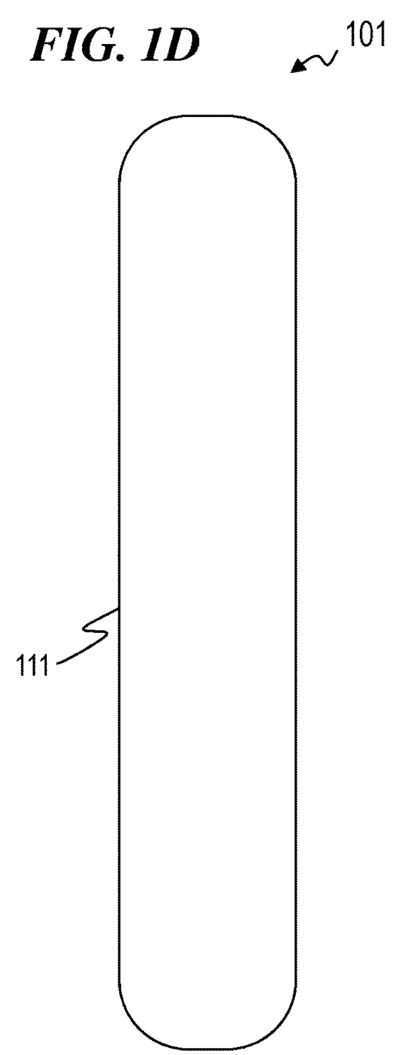
FIG. 1D is a bottom-view diagram of adapter 101, according to some embodiments of the present invention.

FIG. 1D is a bottom-view diagram of adapter 101, according to some embodiments of the present invention.

FIG. 2 is a perspective-view diagram of an adapter system 201, according to some embodiments of the present invention. In some embodiments, adapter system 201 includes an adapter 205 coupled to a handheld electronic device 99. In some embodiments (not shown), adapter 205 is coupled to a case containing device 99. In some embodiments, adapter 205 is substantially similar to adapter 101 of FIGS. 1A-1C. In some embodiments, as shown in FIG. 2, adapter 205 is affixed to device 99 in a substantially central location. In other embodiments (not shown), adapter 205 is affixed to device 99 in any other suitable location.

FIG. 3 is a perspective-view diagram of an adapter system 301, according to some embodiments of the present invention. In some embodiments, adapter system 301 includes an adapter 305 coupled to a handheld electronic device 99. In some embodiments (not shown), adapter 305 is coupled to a case containing device 99. In some embodiments, adapter 305 is substantially similar to adapter 101 of FIGS. 1A-1C, except that the shape of the cutout opening is different). In some embodiments, as shown in FIG. 3, the cutout opening of adapter 305 is angled to accommodate for the position of electronics located on the backside of device 99.

Figure 4A:
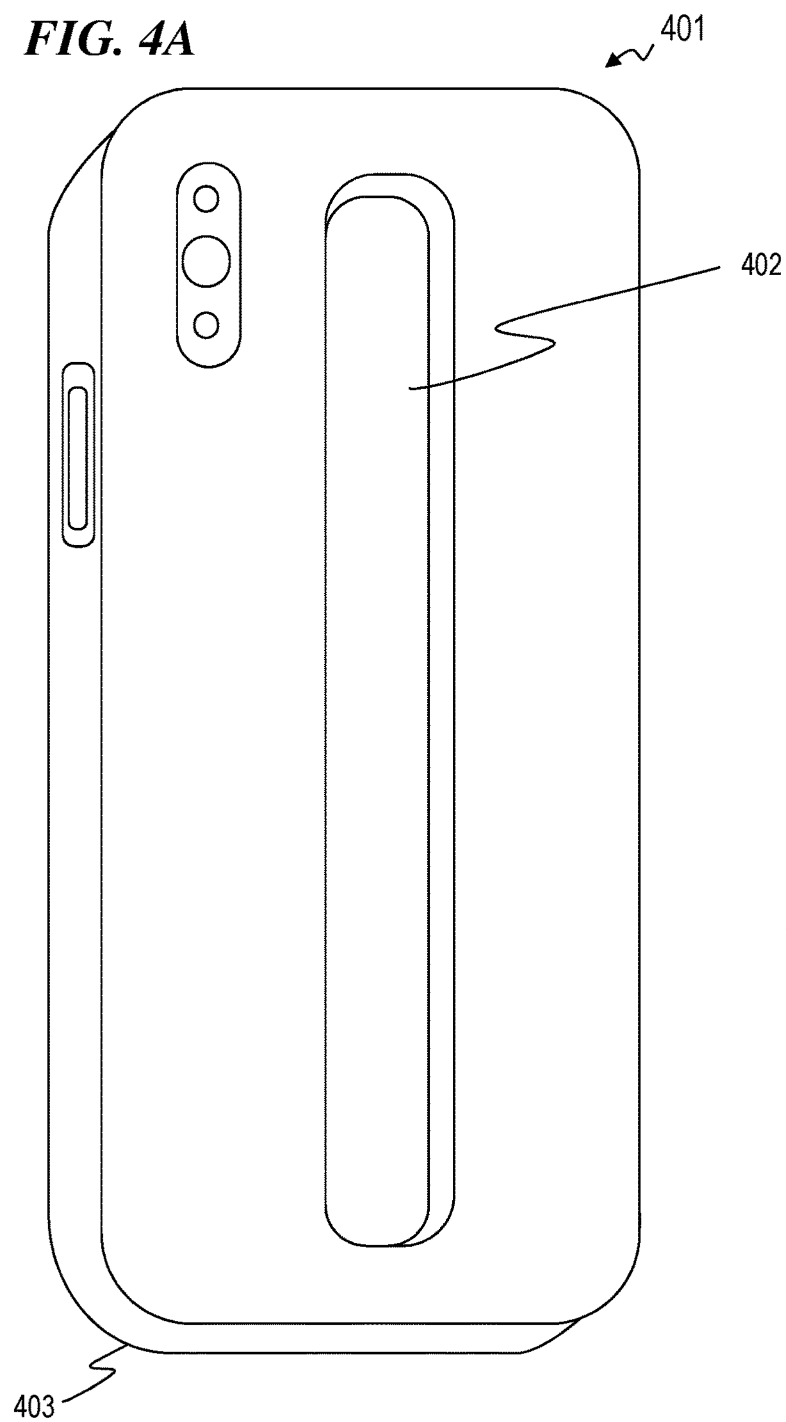
FIG. 4A is a perspective-view diagram of an adapter system 401, according to some embodiments of the present invention.

FIG. 4A is a perspective-view diagram of an adapter system 401, according to some embodiments of the present invention. In some embodiments, system 401 includes a modified case 403 for a handheld electronic device (e.g., in some embodiments, case 403 is for a mobile phone and includes a cutout opening 402 designed to accommodate the PopSockets® product). In some embodiments, including opening 402 as part of case 403 provides a more appealing product for consumers. In some embodiments, cutout opening 402 has a width that accommodates the width of the accordion-type structure of the PopSockets® product. In some embodiments, cutout opening 402 of system 401 has the shape and size shown in FIG. 4A, but in other embodiments, the cutout opening has any other suitable shape or size necessary to fit the specific electronic device being used (e.g., in some embodiments, the cutout opening forms an upside-down Y (see, e.g., cutout opening 502 of FIG. 5), angles to the right (see, e.g., cutout opening 602 of FIG. 6), or has other suitable positions of travel for the PopSockets® product to slide in).

Figure 4B:
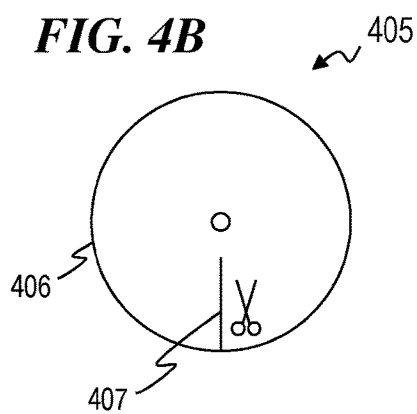
FIG. 4B is a diagram of an adapter component 405, according to some embodiments of the present invention.

FIG. 4B is a diagram of an adapter component 405, according to some embodiments of the present invention. The PopSockets® product generally comes with adhesive on the base button so, in some embodiments, in order for the PopSockets® product to slide on the back side of a device 99 contained within case 403 shown in FIG. 4A, the adhesive is removed or covered. For example, in some embodiments, adapter component 405 includes a sticker 406 that is the same size and shape as a PopSockets® base button and is configured to be placed onto the adhesive of the PopSockets® base button before coupling the PopSockets® product onto case 403. In some embodiments, where case 403 is made from a material that is relatively stiff, sticker 406 includes line 407 and a picture of a pair of scissors to show a direction of a cut that can be made on the base button of the PopSockets® product to ease the coupling of the PopSockets® product with case 403 (in some such embodiments, once the cut is made into the base button, the base button is corkscrewed into cutout opening 402 of case 403).

Figure 5:
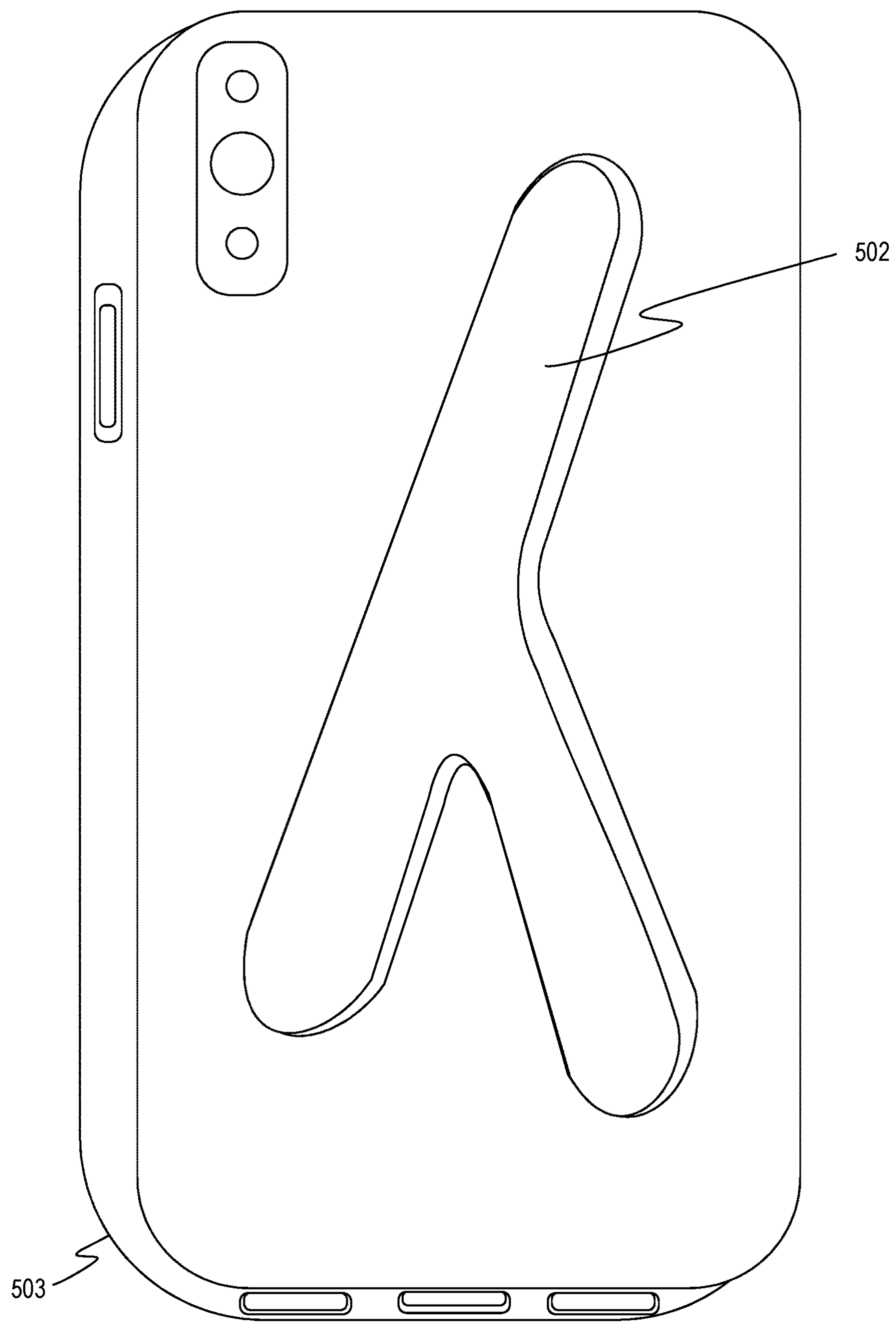
FIG. 5 is a perspective-view diagram of an adapter system 501, according to some embodiments of the present invention.

FIG. 5 is a perspective-view diagram of an adapter system 501, according to some embodiments of the present invention. In some embodiments, system 501 includes a modified case 503 for a handheld electronic device. In some embodiments, modified case 503 includes a cutout opening 502 that forms an upside-down Y.

Figure 6:
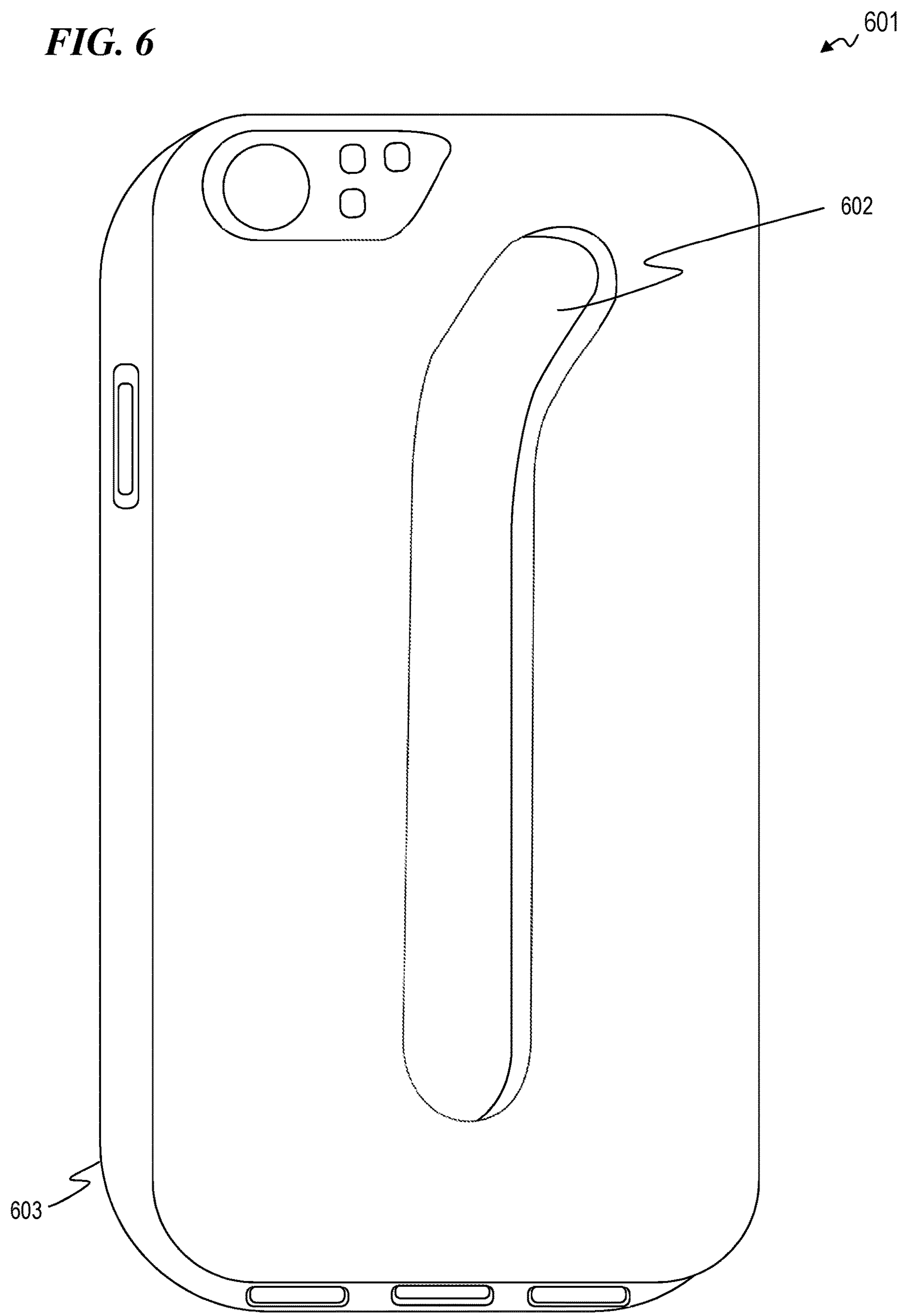
FIG. 6 is a perspective-view diagram of an adapter system 601, according to some embodiments of the present invention.

FIG. 6 is a perspective-view diagram of an adapter system 601, according to some embodiments of the present invention. In some embodiments, system 601 includes a modified case 603 for a handheld electronic device. In some embodiments, modified case 603 includes a cutout opening 602 that curves the to upper right of case 603.

Figure 7A:
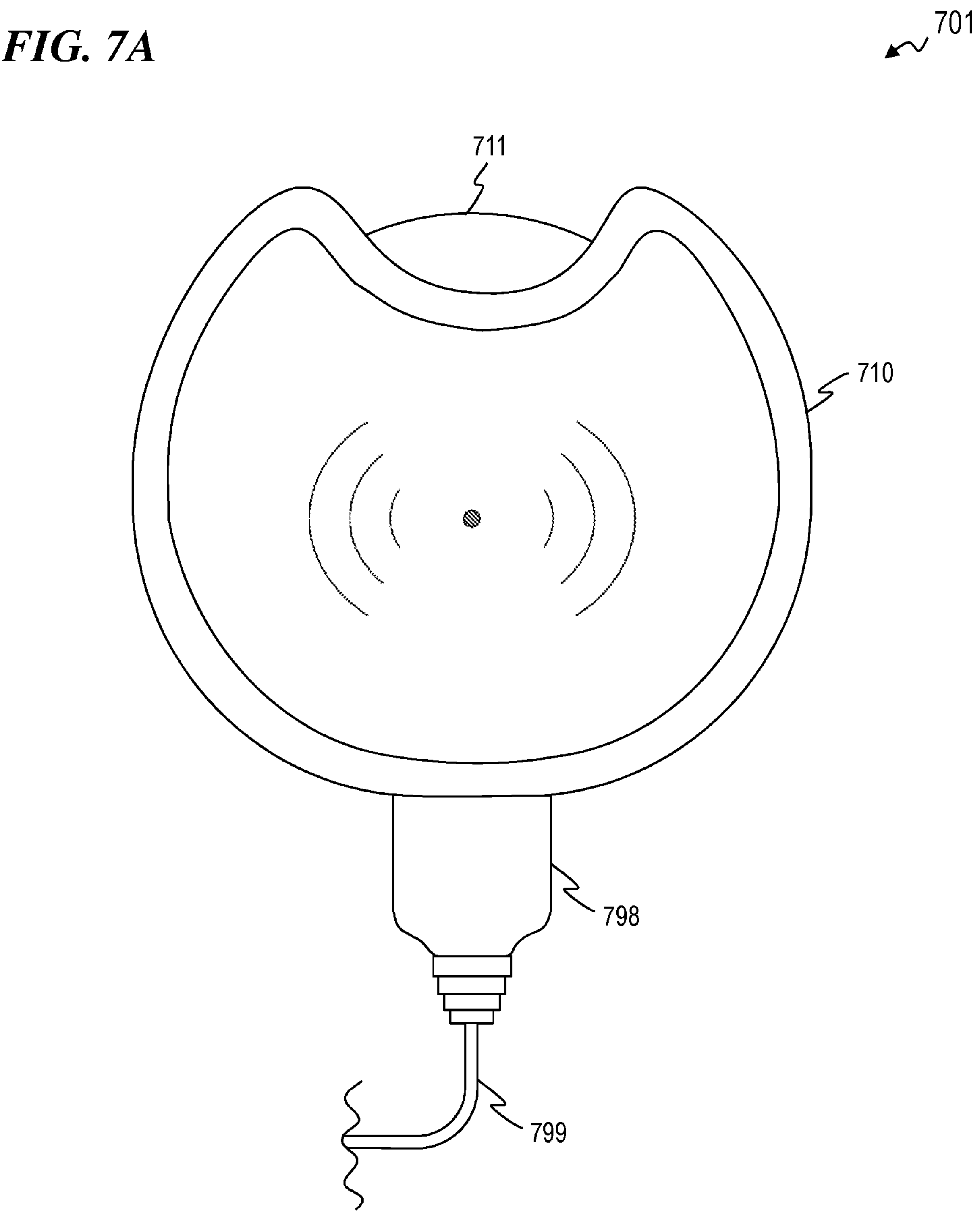
FIG. 7A is a front-view diagram of a vertically-mounted wireless charger 701, according to some embodiments of the present invention.

FIG. 7A is a front-view diagram of a vertically-mounted wireless charger 701, according to some embodiments of the present invention. In some embodiments, charger 701 includes a charging-pad cover 710, a charging-pad case 711, and a power-adapter plug-in 798/power-adapter cable 799. In some embodiments, cover 710 has been modified from its standard circular shape (see, for example, the circular wireless charging pad provided by Samsung Electronics Co., Ltd., www.samsung.com/us/mobile/mobile-accessories/phones/wireless-charging-pad-black-sapphire-ep-pg920ibugus/) in order to accommodate hanging the top button of the PopSockets® product on cover 710. In some embodiments, charger 701 further includes adhesive tape 715 on the back side of charger 701 such that charger 701 can be affixed to a vertical surface (e.g., a wall). In some embodiments, charger 701 is configured to be compatible with a handheld electronic device 99 that is using the PopSockets® product with the adapters and/or systems of the present invention described above (in some such embodiments, the PopSockets® product is positioned near the top of the device 99 such that the device 99 can be hung from charger 701 in a vertical position to wirelessly charge the battery of device 99 when charger 701 is mounted on a wall or any other suitable vertical surface).

Figure 7B:
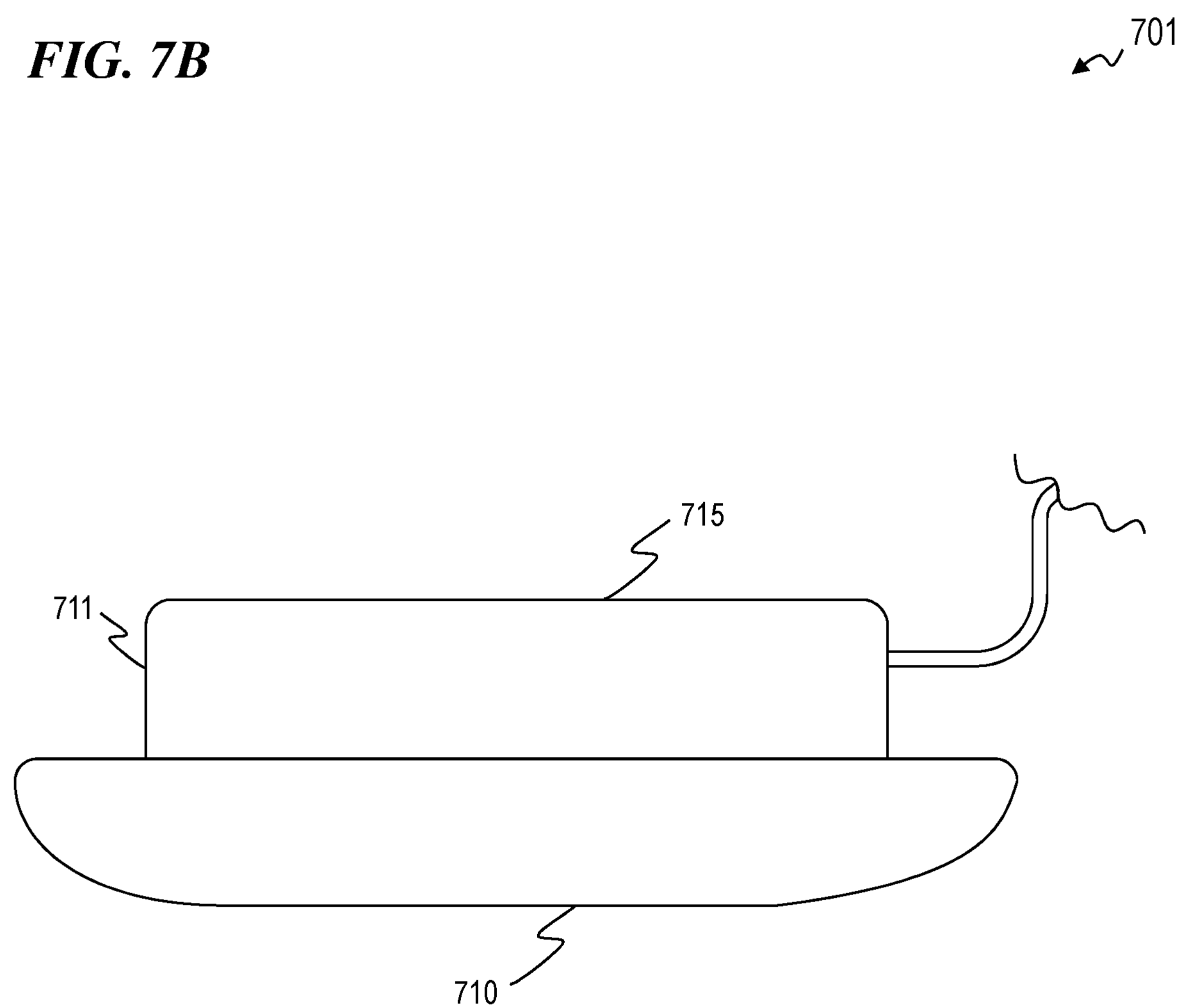
FIG. 7B is a top-view diagram of vertically-mounted wireless charger 701, according to some embodiments of the present invention.

FIG. 7B is a top-view diagram of vertically-mounted wireless charger 701, according to some embodiments of the present invention.

Figure 7C:
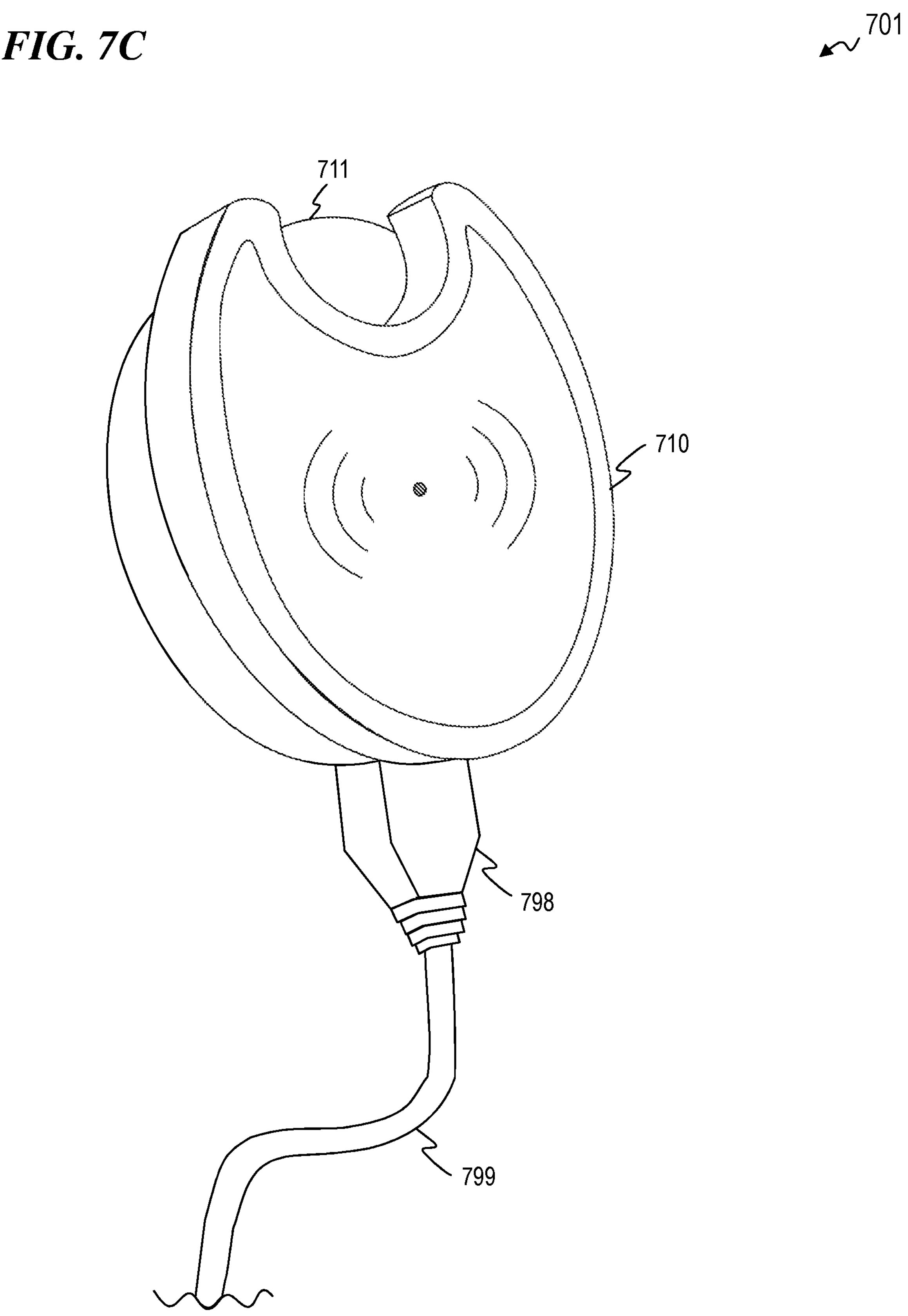
FIG. 7C is a perspective-view diagram of vertically-mounted wireless charger 701, according to some embodiments of the present invention.

FIG. 7C is a perspective-view diagram of vertically-mounted wireless charger 701, according to some embodiments of the present invention.

Figure 8A:
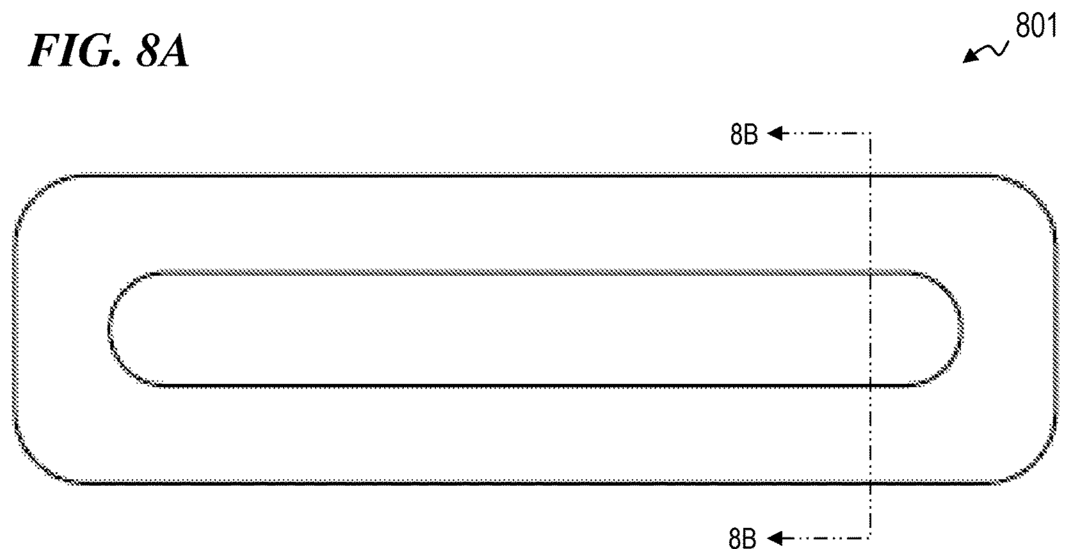
FIG. 8A is a top view diagram of an adapter 801 for a handheld electronic device, according to some embodiments of the present invention.

FIG. 8A is a top view diagram of an adapter 801 for a handheld electronic device, according to some embodiments of the present invention. In some embodiments, adapter 801 includes a bottom layer 811, a top layer 814, and an opening 812 in top layer 814 (see FIG. 8B). In some embodiments, adapter 801 is substantially similar to adapter 101 of FIGS. 1A-1C, except that layers 811 and 814 each include a perimeter structure that assists with the coupling of the two layers. In some embodiments, adapter 801 has a length of approximately 138 millimeters (about 5.4 inches), a width of approximately 41 millimeters (about 1.6 inches), and a depth of approximately 3 millimeters (about 0.12 inches). In some embodiments, opening 812 in top layer 814 has a width of approximately 15 millimeters (about 0.6 inches).

Figure 8B:
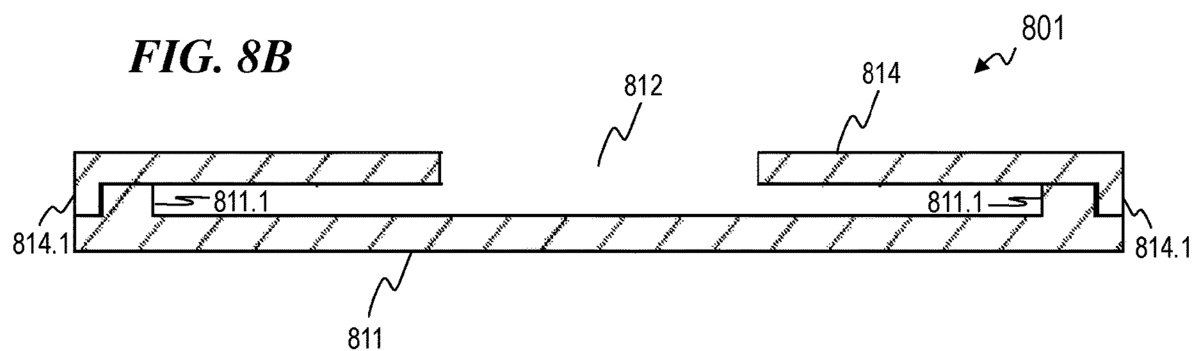
FIG. 8B is an end cross-section view of adapter 801 as would be seen at section line 8B of FIG. 8A, according to some embodiments of the present invention.

FIG. 8B is an end cross-section view of adapter 801 as would be seen at section line 8B of FIG. 8A, according to some embodiments of the present invention. In some embodiments, as shown in FIG. 8B, bottom layer 811 includes a ridge 811.1 that is inset from the outside edge of layer 811 and runs along the perimeter of layer 811, and top layer 814 includes an extension 814.1 that extends down from the outside edge of top layer 814 along the perimeter of top layer 814. In some embodiments, the outer diameter of ridge 811.1 is substantially similar to the inner diameter of extension 814.1 such that bottom layer 811 and top layer 814 couple together in a tight fit in order to strengthen the connection between layer 811 and layer 814 (in some such embodiments, layer 811 and layer 814 are further coupled using an adhesive).

Figure 8C:
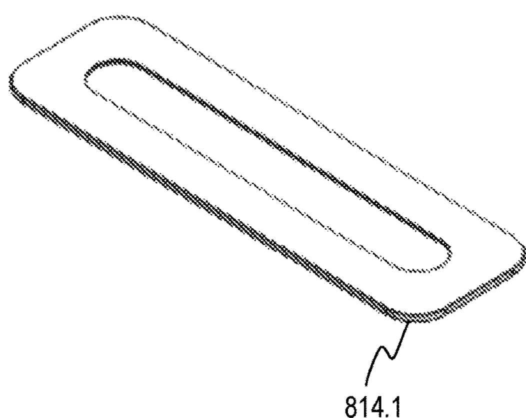
FIG. 8C is a perspective-view diagram of top layer 814 of adapter 801, according to some embodiments of the present invention.

FIG. 8C is a perspective-view diagram of top layer 814 of adapter 801, according to some embodiments of the present invention.

Figure 8D:
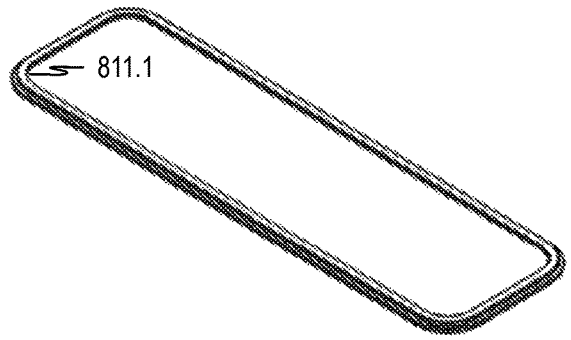
FIG. 8D is a perspective-view diagram of bottom layer 811 of adapter 801, according to some embodiments of the present invention.

FIG. 8D is a perspective-view diagram of bottom layer 811 of adapter 801, according to some embodiments of the present invention.

In some embodiments, the present invention provides an adapter for using a grasp-socket component (e.g., the PopSockets® product or the like that facilitates a human user to more easily hold the mobile device) with a handheld electronic device (e.g., a mobile phone), the adapter including a base layer having a top side and a bottom side, wherein the bottom side of the base layer is configured to connect to the handheld electronic device (e.g., using an adhesive, laser welding or other suitable coupling); and a cover structure having a top surface and a plurality of sides, wherein the cover structure is coupled (e.g., using an adhesive, solvent, laser welding or other suitable coupling) to the top side of the base layer to form a hollow space between the top side of the base layer and the top surface of the cover structure, wherein the cover structure includes an elongated opening in the top surface that is sized such that the grasp-socket component can be coupled to the cover structure and such that the grasp-socket component can be moved to a plurality of positions along the top surface by sliding the grasp-socket component within the hollow space.

In some embodiments, the present invention provides a method for using a grasp-socket component with a handheld electronic device, the method including providing a base layer having a top side and a bottom side; providing a cover structure having a top surface and a plurality of sides, wherein the cover structure includes an elongated opening in the top surface; coupling the cover structure to the base layer such that a hollow space is formed between the top side of the base layer and the top surface of the cover structure; affixing the bottom side of the base layer to the handheld electronic device; and coupling the grasp-socket component to the cover structure such that the grasp-socket component can be moved to a plurality of positions along the top surface by sliding the grasp-socket component within the hollow space.

In some embodiments, the present invention provides an adapter for using a grasp-socket component with a handheld electronic device, wherein the grasp-socket component includes a top button, a base button, and an accordion-type structure that connects the top button to the base button, the adapter including a base layer having a top side and a bottom side; and a top layer having a planar surface and a plurality of side walls coupled to the planar surface, wherein the plurality of side walls of the top layer is coupled to the top side of the base layer to form a partially-enclosed hollow space between the top side of the base layer and the planar surface of the top layer, wherein the top layer includes an elongated opening in the planar surface that is sized and shaped such that the base button of the grasp-socket component can be placed through the elongated opening and into the hollow space and such that the grasp-socket component can be moved to a plurality of positions along the top surface of the base layer by movement of the base button within the hollow space.

In some embodiments of the adapter, the bottom side of the base layer includes an adhesive configured to attach the adapter directly to the handheld electronic device. In some embodiments, the bottom side of the base layer includes an adhesive configured to attach the adapter to a case of the handheld electronic device. In some embodiments, the base layer and the top layer are made from a plastic material.

In some embodiments of the adapter, the elongated opening has a cross-section-of-capsule shape. In some embodiments, the elongated opening has a rectangular shape. In some embodiments, the elongated opening has a dog-leg shape such that the cross-section-of-capsule shape has a first end parallel to a first edge of planar surface and a second end at an obtuse angle relative to the first edge of the planar surface. In some embodiments, the elongated opening has an upside-down-Y shape relative to the commonly used orientation of the handheld electronic device. In some embodiments, the adapter further includes a slide sticker configured to be affixed to the base button of the grasp-socket component in order to improve movement of the base button within the hollow space of the adapter.

In some embodiments of the adapter, the top side of the base layer includes a ridge that is inset from an outside edge of the base layer and that follows a perimeter around the top side of the base layer. In some embodiments, the top side of the base layer includes a ridge that is inset from an outside edge of the base layer and that follows a perimeter around the top side of the base layer, wherein the plurality of side walls of the top layer couple to the base layer outside of the perimeter followed by the ridge.

In some embodiments, the adapter further includes the handheld electronic device, wherein the adapter is attached directly to the handheld electronic device. In some embodiments, the adapter further includes the handheld electronic device, wherein the adapter is attached to a case of the handheld electronic device.

In some embodiments of the adapter, the bottom side of the base layer includes an adhesive that attaches the adapter directly to the handheld electronic device, wherein the grasp-socket component is coupled to the adapter, wherein the adapter is part of an adapter system, and wherein the adapter system further includes a vertically-mounted wireless charger, wherein the handheld electronic device is configured to hang on the vertically-mounted wireless charger via the top button of the grasp-socket component such that the handheld electronic device can receive an electronic charge from the wireless charger. In some embodiments, the bottom side of the base layer includes an adhesive that attaches the adapter to a case of the handheld electronic device, wherein the grasp-socket component is coupled to the adapter, wherein the adapter is part of an adapter system, and wherein the adapter system further includes a vertically-mounted wireless charger that includes a charging-pad cover, wherein the charging-pad cover has a circular shape with a C-shaped cutout on a top portion of the circular shape, and wherein the top button of the grasp-socket component is configured to hang on the C-shaped cutout of the charging-pad cover such that the handheld electronic device can receive an electronic charge from the wireless charger.

In some embodiments, the present invention provides a method for using a grasp-socket component with a handheld electronic device, wherein the grasp-socket component includes a top button, a base button, and an accordion-type structure that connects the top button to the base button, the method including providing a base layer having a top side and a bottom side; providing a top layer having a planar surface and a plurality of side walls coupled to the planar surface, wherein the top layer includes an elongated opening in the planar surface; coupling the top layer to the base layer to form an adapter having a partially-enclosed hollow space between the top side of the base layer and the planar surface of the top layer; and coupling the grasp-socket component to the top layer of the adapter such that the grasp-socket component can be moved to a plurality of positions along the top surface of the base layer by sliding the base button of the grasp-socket component within the hollow space.

In some embodiments, the method further includes affixing the bottom side of the base layer directly to the handheld electronic device. In some embodiments, the method further includes affixing the bottom side of the base layer to a case of the handheld electronic device.

In some embodiments of the method, the elongated opening has a capsule shape. In some embodiments, the elongated opening has a rectangular shape. In some embodiments, the elongated opening has a capsule shape with a first end of the capsule shape angled to a first side of the planar surface. In some embodiments, the elongated opening has an upside-down-Y shape.

In some embodiments, the method further includes providing a slide sticker; and affixing the slide sticker to the base button of the grasp-socket component in order to improve movement of the base button within the hollow space of the adapter. In some embodiments, the top side of the base layer includes a ridge that is inset from an outside edge of the base layer and that follows a perimeter around the top side of the base layer, the method further including coupling the top layer to the base layer such that the plurality of side walls connect to the base layer outside of the perimeter followed by the ridge.

In some embodiments, the method further includes affixing the bottom side of the base layer directly to the handheld electronic device; providing a vertically-mounted wireless charger; and hanging the handheld electronic device on the vertically-mounted wireless charger via the top button of the grasp-socket component such that the handheld electronic device can receive an electronic charge from the wireless charger. In some embodiments, the method further includes affixing the bottom side of the base layer directly to the handheld electronic device; providing a vertically-mounted wireless charger that includes a charging-pad cover, wherein the charging-pad cover has a circular shape with a C-shaped cutout on a top portion of the circular shape; and hanging the top button of the grasp-socket component on the C-shaped cutout of the charging-pad cover such that the handheld electronic device can receive an electronic charge from the wireless charger. In some embodiments, the method further includes affixing the bottom side of the base layer directly to the handheld electronic device; positioning the base button of the grasp-socket component at an upper end of the elongated opening; providing a vertically-mounted wireless charger; and hanging the handheld electronic device on the vertically-mounted wireless charger via the top button of the grasp-socket component such that the handheld electronic device can receive an electronic charge from the wireless charger. In some embodiments, the method further includes affixing the bottom side of the base layer to a case of the handheld electronic device; positioning the base button of the grasp-socket component at an upper end of the elongated opening; providing a vertically-mounted wireless charger; and hanging the handheld electronic device on the vertically-mounted wireless charger via the top button of the grasp-socket component such that the handheld electronic device can receive an electronic charge from the wireless charger.

In some embodiments, the method further includes providing a slide sticker; affixing the slide sticker to the base button of the grasp-socket component in order to improve movement of the base button within the partially-enclosed hollow space of the adapter, wherein the slide sticker includes indicia that identifies a cut line; and cutting the base button along the cut line of the slide sticker, wherein the coupling of the grasp-socket component to the top layer of the adapter includes corkscrewing the cut base button into the elongated opening of the top layer.

In some embodiments, the present invention provides an adapter for using a grasp-socket component with a handheld electronic device, wherein the grasp-socket component includes a top button, a base button, and an accordion-type structure that connects the top button to the base button, the adapter including means for forming a partially-enclosed hollow space in which the base button can be moved to a plurality of positions; means for coupling the partially-enclosed hollow space to the handheld electronic device; and means for coupling the base button of the grasp-socket component to the partially-enclosed hollow space.

In some embodiments, the present invention provides a case for a handheld electronic device that is useable with a grasp-socket component having a top button, a base button, and an accordion-type structure that connects the top button to the base button, the case including a planar surface; and a plurality of side walls coupled to the planar surface, wherein the planar surface includes an elongated opening that is sized and shaped such that the base button of the grasp-socket component can be placed through the elongated opening and into a partially-enclosed hollow space formed between the case and a back side of the handheld electronic device, wherein the partially-enclosed hollow space is configured to provide a plurality of positions to which the grasp-socket component can be moved while the handheld electronic device is coupled to the case.

In some embodiments of the case, the elongated opening has a capsule shape. In some embodiments, the elongated opening has a rectangular shape. In some embodiments, the elongated opening has a capsule shape with a first end of the capsule shape angled to a first side of the planar surface. In some embodiments, the elongated opening has an upside-down-Y shape. In some embodiments, the case further includes a slide sticker that is affixed to the base button of the grasp-socket component in order to improve movement of the base button within the partially-enclosed hollow space, wherein the slide sticker includes indicia that identifies a cut line, and wherein the base button is cut along the cut line such that the cut base button can be corkscrewed into the elongated opening of the case.

In some embodiments, the present invention provides a method for using a grasp-socket component with a handheld electronic device, wherein the grasp-socket component includes a top button, a base button, and an accordion-type structure that connects the top button to the base button, the method including providing a case that includes a planar surface and a plurality of side walls coupled to the planar surface, wherein the planar surface includes an elongated opening; coupling the case to the handheld electronic device to form a partially-enclosed hollow space between the case and a back side of the handheld electronic device; and coupling the grasp-socket component to the case such that the grasp-socket component can be moved to a plurality of positions along the back side of the handheld electronic device by sliding the base button of the grasp-socket component within the partially-enclosed hollow space.

In some embodiments, the method further includes providing a slide sticker; affixing the slide sticker to the base button of the grasp-socket component in order to improve movement of the base button within the partially-enclosed hollow space, wherein the slide sticker includes indicia that identifies a cut line; and cutting the base button along the cut line of the slide sticker, wherein the coupling of the grasp-socket component to the case includes corkscrewing the cut base button into the elongated opening of the case.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," " "second," and "third," etc., are used merely as labels, and are not intended to impose numerical requirements on their objects.

What is claimed is:

1. An adapter for using a grasp-socket component with a handheld electronic device, wherein the grasp-socket component includes a top button, a base button, and an accordion-type structure that connects the top button to the base button, the adapter comprising:

a base layer having a top side and a bottom side; and a top layer having a planar surface and a plurality of side walls coupled to the planar surface, wherein the plurality of side walls of the top layer is coupled to the top side of the base layer to form a partially-enclosed hollow space between the top side of the base layer and the planar surface of the top layer, and wherein the top layer includes an elongated opening in the planar surface that is sized and shaped such that the base button of the grasp-socket component can be placed through the elongated opening and into the partially-enclosed hollow space and such that the grasp-socket component can be moved to a plurality of positions along the top surface of the base layer by movement of the base button within the partially-enclosed hollow space.

2. The adapter of claim 1, wherein the bottom side of the base layer is configured to attach the adapter directly to the handheld electronic device.

3. The adapter of claim 1, wherein the bottom side of the base layer includes an adhesive configured to attach the adapter directly to the handheld electronic device.

4. The adapter of claim 1, wherein the base layer and the top layer are made from a material that includes a polymer.

5. The adapter of claim 1, wherein the elongated opening has a cross-section-of-capsule shape.

6. The adapter of claim 1, further comprising a slide sticker configured to be affixed to the base button of the grasp-socket component in order to improve movement of the base button within the partially-enclosed hollow space of the adapter.

7. The adapter of claim 1, wherein the top side of the base layer includes a ridge that is inset from an outside edge of the base layer and that follows a perimeter around the top side of the base layer, and wherein the plurality of side walls of the top layer couple to the base layer outside of the perimeter followed by the ridge.

8. The adapter of claim 1, further comprising:

the handheld electronic device, wherein the adapter is attached directly to the handheld electronic device.

9. The adapter of claim 1, wherein the bottom side of the base layer includes an adhesive that attaches the adapter directly to the handheld electronic device, wherein the grasp-socket component is coupled to the adapter, wherein the adapter is part of an adapter system, and wherein the adapter system further comprises:

a vertically-mounted wireless charger, wherein the handheld electronic device is configured to hang on the vertically-mounted wireless charger via the top button of the grasp-socket component such that the handheld electronic device can receive an electronic charge from the wireless charger.

10. The adapter of claim 1, wherein the bottom side of the base layer includes an adhesive that attaches the adapter to a case of the handheld electronic device, wherein the grasp-socket component is coupled to the adapter, wherein the adapter is part of an adapter system, and wherein the adapter system further comprises:

a vertically-mounted wireless charger that includes a charging-pad cover, wherein the charging-pad cover has a circular shape with a C-shaped cutout on a top portion of the circular shape, and wherein the top button of the grasp-socket component is configured to hang on the C-shaped cutout of the charging-pad cover such that the handheld electronic device can receive an electronic charge from the wireless charger.

11. A method for using a grasp-socket component with a handheld electronic device, wherein the grasp-socket component includes a top button, a base button, and an accordion-type structure that connects the top button to the base button, the method comprising:

providing a base layer having a top side and a bottom side;

providing a top layer having a planar surface and a plurality of side walls coupled to the planar surface, wherein the top layer includes an elongated opening in the planar surface;

coupling the top layer to the base layer to form an adapter having a partially-enclosed hollow space between the top side of the base layer and the planar surface of the top layer; and coupling the grasp-socket component to the top layer of the adapter such that the grasp-socket component can be moved to a plurality of positions along the top surface of the base layer by sliding the base button of the grasp-socket component within the partially-enclosed hollow space.

12. The method of claim 11, further comprising affixing the bottom side of the base layer to a case of the handheld electronic device.

13. The method of claim 11, wherein the elongated opening has an upside-down-Y shape relative to a primary orientation of the handheld electronic device.

14. The method of claim 11, further comprising:

providing a slide sticker; and affixing the slide sticker to the base button of the grasp-socket component in order to improve movement of the base button within the partially-enclosed hollow space of the adapter.

15. The method of claim 11, further comprising:

providing a slide sticker;

affixing the slide sticker to the base button of the grasp-socket component in order to improve movement of the base button within the partially-enclosed hollow space of the adapter, wherein the slide sticker includes indicia that identifies a cut line; and cutting the base button along the cut line of the slide sticker, wherein the coupling of the grasp-socket component to the top layer of the adapter includes corkscrewing the cut base button into the elongated opening of the top layer.

16. The method of claim 11, wherein the top side of the base layer includes a ridge that is inset from an outside edge of the base layer and that follows a perimeter around the top side of the base layer, the method further comprising:

coupling the top layer to the base layer such that the plurality of side walls connect to the base layer outside of the perimeter followed by the ridge.

17. The method of claim 11, further comprising:

affixing the bottom side of the base layer directly to the handheld electronic device;

providing a vertically-mounted wireless charger; and hanging the handheld electronic device on the vertically-mounted wireless charger via the top button of the grasp-socket component such that the handheld electronic device can receive an electronic charge from the wireless charger.

18. The method of claim 11, further comprising:

affixing the bottom side of the base layer directly to the handheld electronic device;

providing a vertically-mounted wireless charger that includes a charging-pad cover, wherein the charging-pad cover has a circular shape with a C-shaped cutout on a top portion of the circular shape; and hanging the top button of the grasp-socket component on the C-shaped cutout of the charging-pad cover such that the handheld electronic device can receive an electronic charge from the wireless charger.

19. The method of claim 11, further comprising:

affixing the bottom side of the base layer to a case of the handheld electronic device;

positioning the base button of the grasp-socket component at an upper end of the elongated opening;

providing a vertically-mounted wireless charger; and hanging the handheld electronic device on the vertically-mounted wireless charger via the top button of the grasp-socket component such that the handheld electronic device can receive an electronic charge from the wireless charger.

* * * * *